Figure 1:
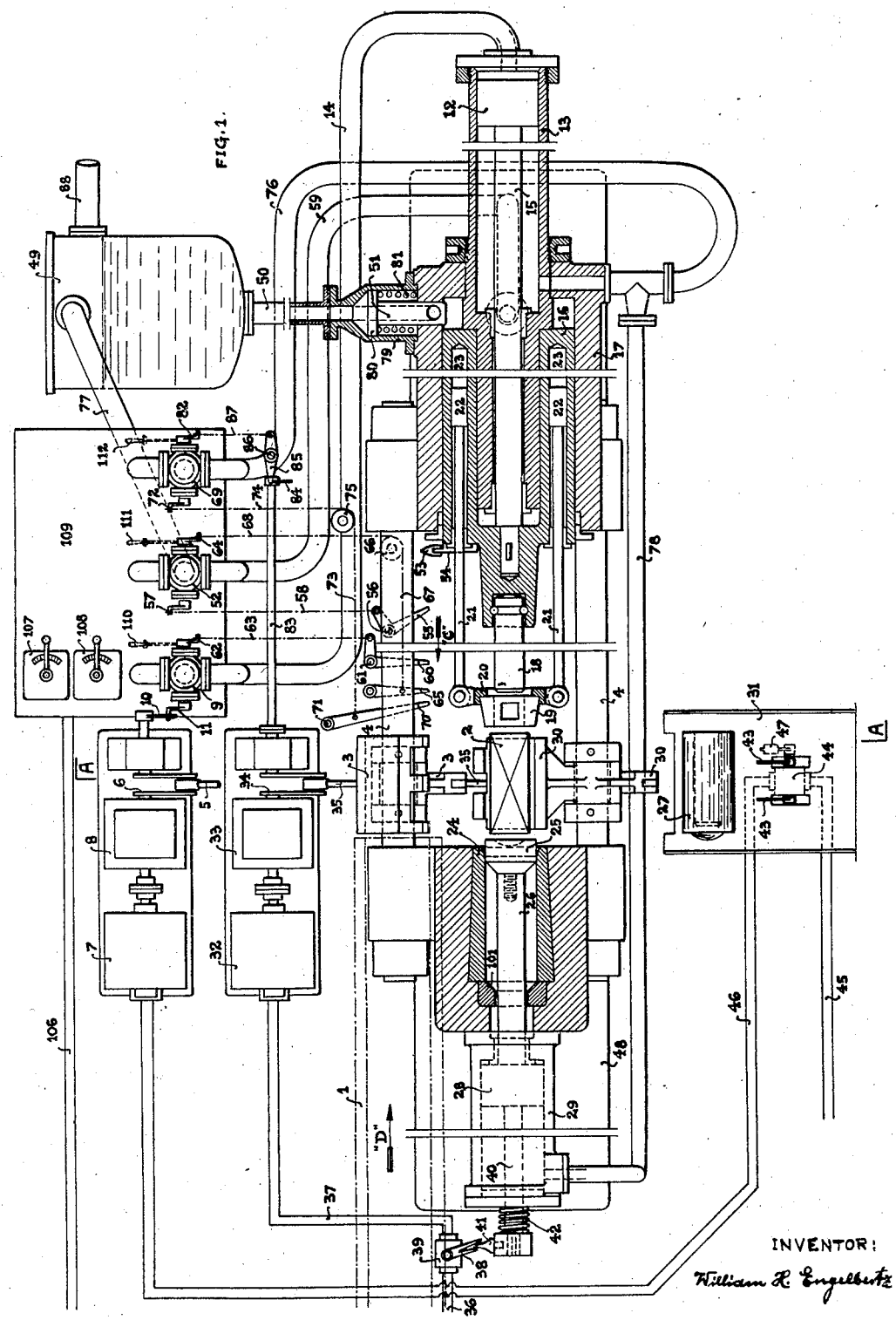

May 21, 1935.  W. H. ENGELBERTZ  2,001,902
APPARATUS FOR THE MANUFACTURE OF SEAMLESS HOLLOW BODIES
Filed June 3, 1933  2 Sheets-Sheet 2

SECTION A-A.

INVENTOR:
William H. Engelbertz

Patented May 21, 1935

2,001,902

UNITED STATES PATENT OFFICE 2,001,902

APPARATUS FOR THE MANUFACTURE OF SEAMLESS HOLLOW BODIES

William H. Engelbertz, Pittsburgh, Pa.

Application June 3, 1933, Serial No. 674,196

6 Claims. (Cl. 78—9)

This invention relates to improvements in apparatus for the manufacture of seamless hollow bodies from solid metal blooms or billets of round or angular shape, which will be referred to as billets, hereafter. It is customary to make such hollow bodies by passing the hot billet through a piercing mill, which yields a tubular product with open ends; or by placing the solid billet into a hydraulic press which transforms it into a thimble- or cup-shaped hollow body with one closed end. While the piercing mill product is stretched into a tube over a mandrel by passing a rolling mill, the cup-shaped body, coming from the hydraulic press, is transformed into a tube on the drawbench or pushbench, by stretching the hollow body over a mandrel.

One object of this invention is to provide a hydraulic press of the horizontal type for the production of either, hollow bodies with one closed end, or such bodies with both ends open.

Another object of the invention is to provide an apparatus for manufacturing goods of the kind described, in which the billet maintains its horizontal position, i. e. the position in which it leaves the furnace, during and after the punching operation. Therefore, the hollow body may be turned over to a drawing apparatus of any suitable kind, or to a rolling mill, without changing its horizontal position.

The invention provides for the production of hollow bodies of the kind referred to above, obtained by co-operating means which supply the solid billet to the press, push said billet into a stationary matrix or die, punch or hollow-out the billet, return the billet-punching tools to their initial position, push the hollowed billet, i. e. the hollow body, out of said die, and eject said body to the delivery table for further treatment.

One achievement of the invention is the automatically timed control of all movements of the apparatus.

The principal achievement of the invention lies in a substantial decrease in manufacturing costs, effected by the elimination of manual labor and by an increase in the output rate.

These and further advantages comprehended by this invention, when compared with apparatus practiced in this art heretofore, will be fully described hereafter, and will be particularly pointed out in the appended claims.

To enable those skilled in the art to readily comprehend and practice this invention, reference should be made to the accompanying drawings. I desire it to be understood that it is not my intention to confine or limit myself to any specific details of construction and arrangement of the various parts described or illustrated herein, since changes and alterations will readily suggest themselves to those skilled in this art without departing from the spirit and scope of the invention.

Figure 2:
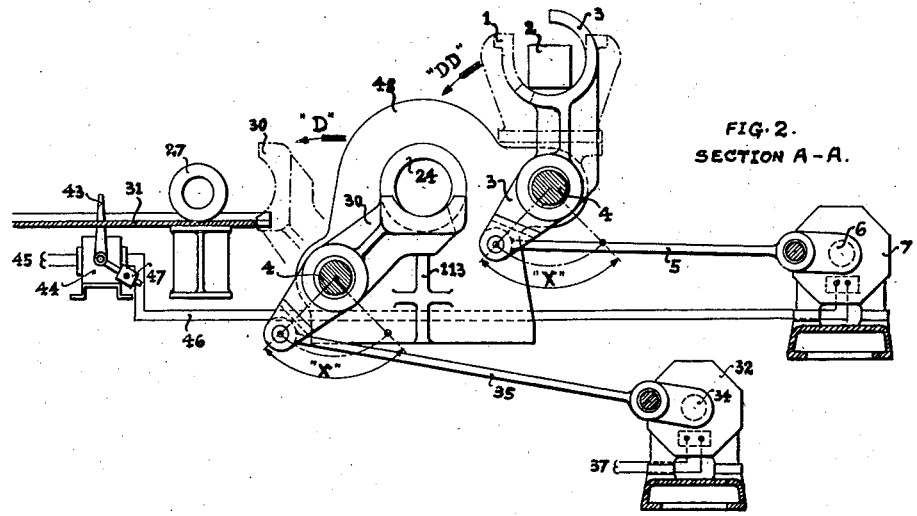
Figures 3, 4:
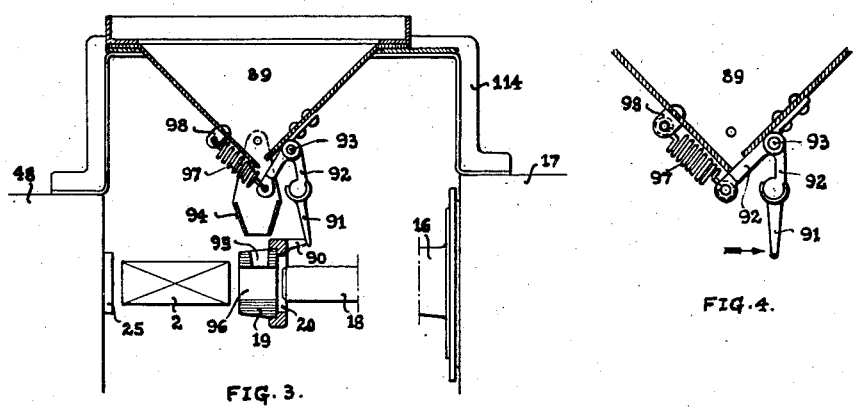
Figures 5, 6:
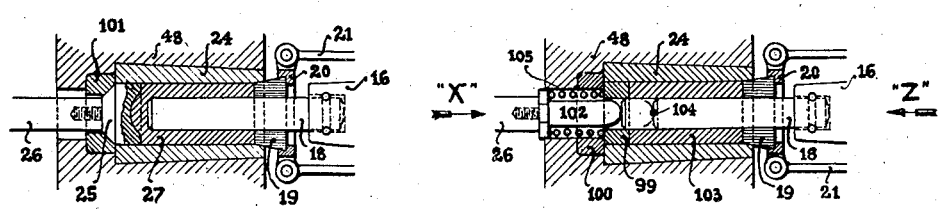

The accompanying drawings show one embodiment of the invention in which Fig. 1 is a plan view of the apparatus; Fig. 2 is a cross-sectional view, taken on line A—A of Fig. 1; Fig. 3 is a cross-sectional side elevation of the coaling device; Fig. 4 is a fragmentary cross-section of said coaling device in enlarged scale; Fig. 5 is a longitudinal section of the cup-shaped body after completion of the punching operation; Fig. 6 is the same as Fig. 5, but shows a hollow body with open ends being produced.

The operation of the apparatus, comprising the invention, may be performed as follows: In Figs. 1 and 2, dot-and-dash lines indicate the billet delivery table 1 on which billet 2, coming from the heating furnace (not shown on the drawing) in direction of arrow "D", advances until it bears on the semi-circular shaped part of pivoting lever 3 which turns about tension-bar 4. Said lever, being connected to crank-shaft 6 by rod 5, will be operated by motor 7 over speed-reducer 8, coupled thereto, so as to effect an "x"-degree turn of lever 3 in direction of arrow "DD" by one revolution of crank-shaft 6, shown by Fig. 2, thus delivering the billet 2 to the press, into a position shown by Fig. 1, and, simultaneously, effecting the opening of valve 9 by means of lever 10, keyed to shaft 6, which turns crank 11 of said valve. Consequently, piston 12, sliding in the stationary cylinder 13 receives the desired pressure through pipe line 14. Since piston-rod 15 is rigidly connected with press-plunger 16, which engages cylinders 13 and 17, and carries at its forward end the mandrel 18, the mandrel-guide 19 with frame 20, connecting-rods 21 and pistons 22, the latter sliding in bore 23 of said press-plunger, the forward motion in direction of arrow "C" of said parts commences simultaneously with that of piston 12. It is evident, according to the situation in Fig. 1, that guide 19 first will bear against billet 2; but, unable to take along said billet, the advancing mandrel 18 slides through the bore of guide 19 and pushes the billet into the die 24 mounted on frame 48, thereby bringing billet-support 25, connected to piston-rod 26, into rest position, as shown by Fig. 5. The mandrel 18 advances further and forces its way into the hot billet as far as indicated in Fig. 5, thereby transforming billet 2 into a cup-shaped body 27.

After the completion of the billet-punching operation, mandrel 18 and press-plunger 16 must be withdrawn, i. e. returned to their initial position, whereupon piston 28 sliding in cylinder 29, receives adequate pressure to push the hollow body 27 out of die 24 by means of piston-rod 26 and support 25. Caught by the semi-circular shaped part of lever 30, which rests on extension 113 of the frame 48 and turns about tension-bar 4, the hollow body 27 will be ejected from the press to the delivery table 31 by means of motor 32, speed reducer 33, coupled thereto, crank-shaft 34 and connecting rod 35, shown by Figs. 1 and 2. Said motor is started after the electric wires 36 and 37 are closed by shifting lever 38 of switch 39 into a position indicated by Fig. 1. Crank-shaft 34, while making one revolution, effects an "x"-degree turn of lever 30 in the direction of arrow "D", thereby ejecting hollow body 27, as shown in Fig. 2, and returning said lever to its initial position. The operation of switch 39 over lever 38, referred to before, is effected by rod 40 of piston 28, at the end of which finger 41 is attached to close and open switch 39 by the medium of lever 38. While said switch is in the closed position shown by Fig. 1, i. e. after the hollow body 27 has been pushed out of die 24, the ejection of said body from the press takes place immediately, as explained above. The reaction of spring 42 disconnects the wires 36 and 37, and, simultaneously, clears said body from its support 25, after the pressure on piston 28 has ceased. The ejected hollow body, on its way for further treatment as indicated by Figs. 1 and 2, turns levers 43, thereby operating switch 44 which, in turn, connects the electric wires 45 and 46, thus starting motor 7 of the billet supplying device, described before, resulting in the commencement of another billet punching operation. Levers 43 of switch 44 may be returned to their initial position by counter-weight 47 after said levers have been released by the passing hollow body 27, thereby disconnecting the wires 45 and 46.

The operation of the hydraulic press starts, in accordance with the invention, by giving a required pressure to piston 12 which advances and takes press-plunger 16 and all parts carried by said plunger along, as has been demonstrated before. The free space left by the advancing press-plunger will immediately be filled out with low-pressure water, supplied by container 49 through connecting pipe line 50 and automatic valve 51.

The advancing mandrel 18, carried by the forward end of press-plunger 16, pushes billet 2 into the die 24. By the time the billet is thus placed in the proper position to be hollowed out, press-plunger 16, on its forward movement opens valve 52 by means of finger 53, carried by holder 54, attached to said plunger, which finger turns the double-lever 55 about its pivot 56, thereby effecting a turning motion of crank 57 of said valve, connected with said double-lever by a suitable means 58. The pipe line 59, connecting valve 52 with press-cylinder 17, then supplies high-pressure water, thereby enabling press-plunger 17 to further advance mandrel 18 into the solid billet 2, thereby forcing aside the material of said billet to fill out the space between said mandrel and die 24, thus forming a cup-shaped body 27, as shown by Fig. 5.

Meanwhile, finger 53 has come in contact with and has turned double-lever 60 about its pivot 61, thereby effecting a turning motion of crank 62, attached to valve 9 by connecting means 63, resulting in closing said valve. Simultaneously with the completion of the billet-punching operation, finger 53 on its forward movement has closed the valve 52 by turning crank 64 of said valve by means of lever 65 and roller 66, connected with said crank by suitable means 67, 68, and said finger has opened valve 69 by turning lever 70 about its pivoting point 71, thereby effecting a turning motion of crank 72, attached to said valve, by connecting means 73, 74 and roller 75. The open valve 69 supplies cylinder 13 with sufficient pressure means through the medium of pipe line 76, thereby permitting the return of piston 12, press-plunger 16 with attached finger 53, and mandrel 18, to their initial position. Said plunger, on its return stroke forces the water, occupying the space between cylinders 13 and 17, through pipe line 59, valve 52, and pipe line 77, into container 49, for re-use.

While mandrel 18, press-plunger 16, and piston 12 are still on their way back, piston 28, sliding in cylinder 29, receives adequate pressure through pipe line 78, which is a branch of pipe line 76, in order to push the hollow body 27 out of die 24 by means of piston-rod 26 and support 25, and, simultaneously, to return mandrel-guide 19 with its supporting means 20, 21, 22, back to the initial position. Valve 51 may be of the one-way type, so that it will stay closed, i. e. in the position shown on the drawing, as long as cylinder 17 is under pressure. Valve 51 consists of body 79, seat 80 with a finger-like extension, and spring 81. After the pressure in cylinder 17 has ceased, valve-seat 80 by the weight of the water in container 49 will advance towards cylinder 13 so that the filling-water may immediately enter cylinder 17 through the bore of seat 80 and its extension.

After mandrel 18 and press-plunger 16 have arrived at their initial position, and hollow body 27 has been pushed out of die 24, as described before, valve 69 will be closed and, simultaneously, said body will be ejected to the delivery table 31 for further treatment. This will be performed by the operation of electric switch 39, referred to already, thus starting the drive of the hollow-body ejecting device, which in turn, by one revolution of crank-shaft 34, causes a turning motion of crank 82 attached to valve 69, by means of lever 84, keyed to crank-shaft extension 83, lever 85 which turns about its pivoting point 86, and a suitable connecting means 87.

Pipe 88 in Fig. 1 will regulate the water level in container 49, and, therefore, serves as an overflow-water pipe. Of course, such water surplus may be returned to the power plant for re-use.

During the billet-punching operation, shown after its completion in Fig. 5, mandrel-guide 19 bears against the centered part of die 24, and is kept under pressure by air-cushions 23, created by the advancing press-plunger 16 after the forward motion of guide 19 has been stopped by stationary die 24. The pressure of said cushions, plus the pressure between the contacting surfaces of hollow body 27 and die 24, shall, in accordance with the invention, exceed the friction between mandrel 18 and hollow body 27 when said mandrel is to be withdrawn after completion of the billet-punching operation.

Another feature of the invention is the automatically acting coaling device, shown by Figs. 3 and 4. A small quantity, say a handful, of suitably grained high-gaseous coal, supplied by container 89, resting on the structural frame 114, may, prior of each billet punching operation, be released from said container. As mandrel-guide 19 reaches its rest position, shown by Fig. 3, while hollow body 27 is being pushed out of die 24, as described before, finger 90 of guide-frame 20 turns lever 91 in arrow direction (Fig. 4), thus opening lock 92 which revolves through a certain angle about pivot 93. In this manner, the coal, a small quantity at a time, will find its way through funnel 94 and opening 95 of mandrel-guide 19, to the bottom of bore 96 of said guide. Meanwhile, another billet 2 has been placed (Fig. 1) whereupon the advance of mandrel 18 and guide 19 commences, as has been explained already. Then, the advancing mandrel presses the coal, present in the bore of guide 19, against and into the billet 2, thus preventing a vacuum between mandrel and billet during and after the punching operation, by means of the rapidly developing coal-gases. This, in turn, results in an easier withdrawal of mandrel 18.

The release of lever 91 by finger 90 effects the closing of lock 92 by the reaction of springs 97, which may be connected with said lock at one end, and with fixed holders 98 at the other end. Fig. 4 shows the coaling device locked while Fig. 3 shows said device in action.

The production schedule of the apparatus, comprising this invention, shall not be limited to the manufacture of cup-shaped bodies, but may include the production of hollow bodies with both ends open, as shown in Fig. 6. For this purpose, ring 99 may serve as billet support, replacing support 25 in Fig. 5, while supporting-ring 100 will replace countersunk ring 101 in Fig. 5. The mandrels 18 and 102, when advanced in direction of arrows "X" and "Z", respectively, will perform the piercing operation on billet 2, thus producing the hollow body 103. This piercing effect may be obtained by applying a greater force in direction "Z" than in direction "X", thereby enabling mandrel 18 to advance faster than mandrel 102, so as to have both mandrels meet at point 104 approximately, indicated by Fig. 6. At said meeting point, the advance of mandrel 102 will be stopped by mandrel 18, the latter continuing its forward motion until reaching the position shown by Fig. 6, with mandrel 102 pushed back to its initial position by the greater force exerted by mandrel 18. The withdrawal of mandrel 18 from the pierced billet 103 will be performed in the same manner as from the cup-shaped body 27 in Fig. 5. The push-out of the pierced body 103 from die 24 will also be carried out as with reference to the cup-shaped body, i. e. by applying pressure to piston 28. Consequently, ring 99, connected by means of spring 105 to the base of mandrel 102, advances with piston-rod 26 and pushes the pierced billet 103 out of die 24.

In the manufacture of pierced billets or bodies 103, the use of a coaling device, referred to before, may be dispensed with.

Alternatively, the electric current for motors 7 and 32 of the billet-supplying and hollow-body ejecting device, respectively, may be furnished by wires 106 through starters 107 and 108, located on platform 109. The requisite wiring and control means connecting said starters and motors, are not shown on the drawing, since they form no part of the invention.

The valves 9, 52, 69, may be operated by hand-levers 110, 111, 112, attached to said valves as indicated by dotted lines in Fig. 1.

In accordance with the invention, starters 107 and 108 are to be used, and valves 9, 52, 69, are to be hand-operated, only when manual labor is temporarily employed to replace the automatic means provided, as for example, in case of emergency.

Instead of using the electric switches 39 and 44 with their auxiliary equipment, any suitable kind of electrical appliances, for instance, automatically acting photoelectric relays, may be utilized.

While the drawings show three valves 9, 52, 69, to operate cylinders 13, 17, 29, any number of valves may be used. The type of valves shown on the drawings serves for demonstration purposes only.

What I claim is:

1. An apparatus for manufacturing hollow bodies from heated solid-metal billets, comprising a main cylinder and a plunger therein, a billet punching mandrel and a mandrel guide, means connecting the mandrel and mandrel guide with the plunger, a stationary billet holder with a pocket therein to accommodate the billet, a mechanically operated coal-supplying device with a coal container, for timed placement of suitably grained coal between, and in alignment with, said mandrel and billet to prevent a vacuum between the metal of the billet and the mandrel, during and after the hollow-body forming operation, an auxiliary cylinder, partially projecting into the main cylinder and partially engaging said plunger therein, with a piston therein rigidly connected to said plunger, pressure fluid applied to said piston for advancing the piston, the mandrel, the coal and the mandrel guide, to advance and place the billet into working position within said holder, high pressure fluid applied to the plunger to force the mandrel into the stationarily-held billet, thus hollowing out the billet longitudinally while displacing the metal of the billet laterally, so as to form a hollow body with one closed end, pressure fluid supplied to the auxiliary cylinder for reversing the direction of motion of the piston therein, thereby withdrawing the mandrel from the hollow body and returning the plunger and said mandrel to their initial position, a second auxiliary cylinder, a piston therein one end of which projects into the pocket of the billet holder, while the other end extends beyond the length of the cylinder, pressure fluid supplied to said cylinder for advancing the piston, thereby effecting, the ejection of the hollow body from its holder and the return of the mandrel guide to its initial position by means of the first-mentioned piston extension and, thereafter, the expulsion of the hollow body from its support by means of the second-mentioned piston extension and cooperatively connecting means projecting into the path of the last-mentioned piston extension, a delivery table for receiving the hollow body after its expulsion, a switch on said table, a billet supplying device, means connecting said switch with the billet supplying device, means connected to said switch and extending into the path of the hollow body upon said table, acting upon said switch to impart relative movement to said supplying device, thereby placing another billet in alignment with, and between, the punching mandrel and the billet holder.

2. An apparatus for manufacturing hollow bodies from heated solid-metal billets, comprising a main cylinder with a plunger therein, a mandrel and a mandrel guide, means connecting the mandrel and mandrel guide with the plunger, a second cylinder, a piston therein extended at both ends, a mandrel connected to, and carried by, one of said piston extensions, a stationary billet holder, in alignment with, and between, said cylinders, with a pocket therein to accommodate the billet, an auxiliary cylinder, partially projecting into the main cylinder and partially engaging the plunger therein, having a piston rigidly connected to said plunger, pressure fluid applied to said piston for advancing the plunger with the mandrel and mandrel guide, to place the billet into working position within said holder, high pressure fluid, supplied to the plunger in the main cylinder and to the piston in the second-mentioned cylinder, for advancing both mandrels, connected to said plunger and piston, respectively, in opposite direction to each other, into the stationarily held billet, thus piercing the billet longitudinally while displacing the metal of the billet laterally so as to form a hollow body open at both ends, pressure fluid applied to the plunger for further advancing the mandrel connected thereto, thereby returning the second-mentioned mandrel and the piston, carrying the same, to their initial position, pressure fluid supplied to the auxiliary cylinder for reversing the direction of motion of the piston therein, thereby withdrawing the mandrel from the hollow body and returning the plunger with said mandrel to their initial position, pressure fluid supplied to the second-mentioned cylinder for re-advancing the piston therein, causing relative movement of said piston-extensions, thereby effecting, the ejection of the hollow body from its holder and the return of the mandrel guide to its initial position by means of one of said piston extensions and, thereafter, the expulsion of the hollow body from its support by means of the second piston extension and co-operatively connecting means projecting into the path of the last-mentioned piston-extension, a delivery table for receiving the hollow body after its expulsion, a switch on said table, a billet supplying device, means connecting said switch with the billet supplying device, means connected to said switch and extending into the path of the hollow body upon said table, acting upon said switch to impart relative movement to said supplying device, thereby placing another billet in alignment with, and between, the punching mandrels.

3. In an apparatus for the manufacture of a hollow body, open at one end, from a heated solid billet by forcing a mandrel into the metal of the billet held stationary within a holder, a billet supplying device, a mandrel-advancing cylinder with a piston therein, a valve for pressure fluid supply, means connecting the valve with the cylinder, means interlocking the billet-supplying device with the valve, means for timed start of the billet-supplying device, thus advancing the mandrel after the billet has been supplied, and pushing the billet into working position within said holder, a second cylinder, a plunger therein connected to and advancing with the mandrel, a second valve, means connecting said valve with the second cylinder, means connected with said valve and extending into the path of the plunger, thereby acting upon said valve and causing it to supply the second cylinder with high pressure fluid for further advancing the plunger and forcing the mandrel into the billet, means connected with the first-mentioned valve and extending into the path of the plunger, causing said valve to close and to stop the fluid supply for the first-mentioned cylinder, means connected with the second valve and extending into the path of the plunger, thereby simultaneously effecting the closing of said valve and the completion of the hollow body forming operation, a third valve, means connected with said valve and extending into the path of the plunger at the end of its forward movement, causing said valve to open and to supply fluid to the first-mentioned cylinder to reverse the direction of motion of the piston therein, thus withdrawing the plunger and the mandrel, connected thereto, from the hollow body, a third cylinder, a piston therein having an axial extension at each end, means connecting said cylinder to the means connecting the third valve with the first-mentioned cylinder, pressure fluid supplied to the third cylinder by said action of the third valve, thereby pushing the hollow body out of its holder, hollow-body kick-out means, a drive thereto, connecting means between the kick-out drive and the kick-out means, a motor for said drive, a switch, means connecting said switch with the motor, means connected with said switch and extending into the path of one of said piston extensions, causing the start of said switch, the action of said switch being operative to impart relative motion to said kick-out drive and the kick-out means, thus effecting the expulsion of the hollow body from its support, and the closing of the third valve.

4. In an apparatus for the manufacture of a hollow body, open at both ends, from a heated solid billet when forcing two mandrels longitudinally, from opposite ends, into the metal of the billet held stationary within a holder, a billet-supplying device, a cylinder with a piston therein for advancing one of said mandrels, a valve for pressure-fluid supply, means connecting the valve with the cylinder, means interlocking the billet-supplying device with the valve, means for timed start of the billet-supplying device, thus advancing the mandrel after the billet has been supplied, and pushing the billet into working position within said holder, a second cylinder, a plunger therein connected to, and advancing with, the last-mentioned mandrel, a third cylinder, a piston therein carrying the second mandrel, a second valve, means connecting said valve with the second and third cylinder, means connected with said valve and extending into the path of the plunger, thereby acting upon said valve and causing it to supply the second and third cylinder with high-pressure fluid to advance the plunger and piston, respectively, therein, and to force the mandrels, connected thereto, into the billet, means connected with the first-mentioned valve and extending into the path of the plunger, causing closing of said valve and stopping of the fluid supply for the first-mentioned cylinder, means connected with the second valve and extending into the path of the plunger, thereby simultaneously effecting the closing of said valve, the completion of the billet-piercing operation, and the arrival of said piston with the second mandrel, connected thereto, at their initial position, a third valve, means connected with said valve and extending into the path of the plunger at the end of its forward movement, thereby opening said valve and supplying pressure fluid for the first-mentioned cylinder to reverse the direction of motion of the piston therein, thus withdrawing the plunger and the mandrel, connected thereto, from the hollow body, means axially extending from the piston in the third cylinder, means connecting said cylinder to the means connecting the third valve with the first-mentioned cylinder, pressure fluid supplied to the third cylinder by said action of the third valve, thereby pushing the hollow body out of its holder, hollow-body kick-out means, a drive thereto, connecting means between the kick-out drive and the kick-out means, a motor for said drive, a switch, means connecting said switch with the motor, means connected with said switch and projecting into the path of the said piston-extension, causing the start of said switch, the action of said switch being operative to impart relative motion to said kick-out drive and the kick-out means, thus effecting the expulsion of the hollow body from its support, and the closing of the third valve.

5. In an apparatus for the manufacture of hollow bodies from heated solid-metal billets, a main cylinder with a plunger therein carrying a billet punching mandrel, an auxiliary cylinder, partially projecting into the main cylinder and partially engaging the plunger therein, with a piston therein rigidly connected to said plunger, a stationary holder, in alignment with the mandrel, having a pocket to accommodate the billet therein, means for placing a billet in alignment with, and between, said pocket and mandrel; a container carrying low-pressure fluid, means connecting the container with the main cylinder, a self-aligning valve within said connecting means for controlling the flow of fluid from the container into said cylinder; pressure fluid supplied to the auxiliary cylinder for advancing the plunger and billet punching mandrel, connected thereto, thereby advancing and placing the billet into working position within the pocket of said holder, and the mandrel against the billet; a valve for high-pressure fluid supply to the main cylinder for further advancing the plunger therein and the billet punching mandrel; thereby effecting, first, closing of the first-mentioned valve to stop the low-pressure fluid supply from said container; second, forcing of said mandrel into the solid billet so as to form the latter into a hollow body; means connecting the second-mentioned valve with the main cylinder, means connecting said valve with the low-pressure fluid container; pressure fluid supplied to the auxiliary cylinder, after completion of the hollow-body forming operation, for reversing the direction of motion of the piston therein; thereby withdrawing the punching mandrel from the hollow body and returning said plunger with said mandrel towards their initial position, while, simultaneously, the said plunger forces the fluid, still present in the main cylinder, through the second-mentioned valve back into the low-pressure fluid container for re-use.

6. In an apparatus for the manufacture of hollow bodies from heated solid-metal billets of angular cross-section, a main cylinder with a plunger therein, a billet-punching mandrel with mandrel guide carried by the plunger, an auxiliary cylinder, partially projecting into the main cylinder and partially engaging the plunger therein, with a piston therein rigidly connected to said plunger, pistons within the wall of the plunger, means connecting the last-mentioned pistons with the mandrel guide, a stationary billet holder having a longitudinally cylindrical pocket of circular cross-section from end to end, means for placing a billet in alignment with, and between, said pocket and mandrel, a gaseous-means supplying device in alignment with, and between, the mandrel and billet to prevent a vacuum between the metal of the billet and the mandrel after the hollow-body forming operation; pressure fluid applied to the auxiliary cylinder for advancing the plunger and the mandrel and mandrel guide, carried by the plunger, thereby effecting, first, placement of an angular-shaped billet into working position within the pocket of said holder so as to have the longitudinal edges of the billet bear against the wall of the pocket; second, centered bearing of the mandrel guide against the billet holder; high-pressure means forcing the mandrel into the billet longitudinally, thereby filling out the segment-like hollow spaces between the billet and pocket-wall while laterally displacing the metal of the billet, thus forming a hollow body, with bottom at one end, from said billet, and of the same length as the billet; air-cushions created in the rear of the last-mentioned pistons within the wall of the plunger, while the plunger advances and said pistons remain stationary during the hollow-forming operation, to maintain the position of the hollow body within its holder by pressing the mandrel guide against said holder while the mandrel is being withdrawn.

WILLIAM H. ENGELBERTZ.